(12) United States Patent
Triebel et al.

(10) Patent No.: US 9,093,845 B2
(45) Date of Patent: Jul. 28, 2015

(54) ELECTRICAL ENERGY STORE AND METHOD FOR CLOSED-LOOP CONTROL OF SUCH ENERGY STORE

(75) Inventors: Clemens Triebel, Berlin (DE); Erich Bosch, Hangelsberg (DE)

(73) Assignee: Cellstrom GmbH, Wiener Neudorf (AT)

( * ) Notice: Subject to any disclaimer, the term of this patent is extended or adjusted under 35 U.S.C. 154(b) by 379 days.

(21) Appl. No.: 13/702,777

(22) PCT Filed: Jun. 1, 2011

(86) PCT No.: PCT/EP2011/059109
§ 371 (c)(1),
(2), (4) Date: Jan. 30, 2013

(87) PCT Pub. No.: WO2011/154306
PCT Pub. Date: Dec. 15, 2011

(65) Prior Publication Data
US 2013/0127396 A1      May 23, 2013

(30) Foreign Application Priority Data
Jun. 8, 2010   (AT) .................................. A 938/2010

(51) Int. Cl.
*H02J 4/00*     (2006.01)
*H02J 3/32*     (2006.01)
*H02J 7/00*     (2006.01)

(52) U.S. Cl.
CPC ... *H02J 4/00* (2013.01); *H02J 3/32* (2013.01); *H02J 7/0018* (2013.01)

(58) Field of Classification Search
CPC .............. H02J 4/00; H02J 1/102; H02J 3/32; H02M 2001/007; Y02B 70/1491
USPC .......................................................... 320/101
See application file for complete search history.

(56) References Cited

U.S. PATENT DOCUMENTS

| | | | |
|---|---|---|---|
| 7,768,800 B2 * | 8/2010 | Mazumder et al. | 363/17 |
| 7,939,190 B2 | 5/2011 | Colello et al. | |
| 8,559,193 B2 * | 10/2013 | Mazumder | 363/8 |
| 2012/0326516 A1 * | 12/2012 | Gurunathan et al. | 307/72 |
| 2012/0326668 A1 * | 12/2012 | Ballatine et al. | 320/109 |

OTHER PUBLICATIONS

M. Brenna et al., "DC Power Delivery in Distribution Generation Systems" in Harmonics and Quality of Power, 2008, ICHQP 2008, 13th Int. Conference on IEEE, Sep. 2008.

S. Kim et al., "Dynamic Modeling and Control of Grid-Connected Hybrid Generation System with Versatile Power Transfer" in IEEE Transactions on Industrial Electronics, vol. 55, No. 4, Apr. 2008, pp. 1677-1688.

\* cited by examiner

*Primary Examiner* — Sun Lin
(74) *Attorney, Agent, or Firm* — Dykema Gossett PLLC (57) ABSTRACT

In installations for generating alternative energy it is necessary due to the fluctuating availability of the alternative energy source to provide electrical energy stores which can temporarily store excess energy or can compensate for energy bottlenecks. The present invention relates to such an electrical energy store having a bidirectional DC/DC converter with a low-voltage side and a high-voltage side which can be connected via the high-voltage side to a DC bus and which has a switching hysteresis with a charging and/or discharge curve, wherein power consumption and/or power output are/is dependent on a voltage on the high-voltage side.

19 Claims, 5 Drawing Sheets

ELECTRICAL ENERGY STORE AND METHOD FOR CLOSED-LOOP CONTROL OF SUCH ENERGY STORE

BACKGROUND OF THE INVENTION

1. Field of the Invention

The present invention relates to an electrical energy store having a bidirectional DC/DC converter, to a method for controlling such an energy store, and to the integration of such an energy store in an installation for storing electrical energy.

2. The Prior Art

A main problem of alternative energy such as, e.g., solar energy or wind power, is the availability thereof which principally cannot be influenced. When generating alternative energy it is therefore desirable to temporarily store energy in times of excess energy so as to be able to deliver the energy again in times of high demand and low availability of alternative energy. As storage for electrical energy, energy stores such as, e.g., batteries are well suited. Particularly suitable are redox flow batteries, which are known per se, such as, e.g., vanadium redox flow batteries. Large battery systems usually consist of a multiplicity of small cells connected so as to form cell stacks which are electrically interconnected so as to obtain a desired high power output. A redox flow battery consists, e.g., of a plurality of modules, wherein each module can comprise a multiplicity of cells or cell stacks.

It is well known that such batteries can be connected to an electrical supply grid via a DC/DC converter and a DC/AC converter, and possibly via a transformer. Thus, the battery serves for absorbing and storing excessive alternative energy and to deliver it again to the grid if the alternative energy cannot cover the demand of the grid. In this connection it is known, e.g., that the different energy sources (wind power, solar energy, battery, etc.) are connected in parallel to the grid.

By parallelizing large cell stacks or large modules from a plurality of cell stacks, e.g., in the 100 kW range, storage systems with a power capacity in the MW range can be implemented in a simple manner. For optimizing the efficiency, individual units of such units are often connected and disconnected according to demand. In this manner, self-discharge in said cells can be minimized and the energy expenditure for circulating the electrolyte can be reduced. If a storage system is built from a few cell stacks or modules, e.g., in the 100 kW range, this adaptation can take place only in very large discrete steps so that the optimum efficiency increase cannot be achieved. Moreover, damage to a unit results in a considerably reduced maximum power capacity of the storage system. When using large batteries, there is the additional disadvantage that much effort is necessary for a stable closed-loop control because the systems are controlled in master-slave operation. As soon as the number becomes high, the individual modules often can only be controlled in blocks so that often no optimal operation is ensured.

Like the setup from large parallelized units, the setup from small parallelized units, e.g., in the kW range, can also be implemented. The advantages here are very good adaptability to the power demand in terms of design and operational control, and very low influence on power provision in the event of failure of a unit. In addition, self-discharge in the case of small cell stacks or units is lower. The disadvantage here is that closed-loop control of such a system, e.g., through a central control and a bus system is complex and interference-prone.

From U.S. Pat. No. 6,184,593 B1 it is known to connect a plurality of energy sources such as, e.g., generators, turbines, batteries, solar cells, fuel cells, etc. in parallel to a DC bus via in each case one DC/DC converter, rectifier or power inverter. A load can then be supplied via a DC/AC converter on the DC bus. Here too, there is the problem of high granularity of the power range, or of the need of a complicated closed-loop control.

The present invention relates to an electrical energy store from a plurality of cell stacks, and to a method for closed-loop control of such an energy store, and to integrating such an energy store into an installation for generating electrical energy with a plurality of different energy sources. The underlying object is in particular to keep simple the closed-loop control of the electrical store consisting of a multiplicity of cell stacks.

SUMMARY OF THE INVENTION

This object is achieved according to the invention by providing a bidirectional DC/DC converter which can be connected via the high-voltage side to a DC bus and which has a switching hysteresis with a charging and/or discharging curve, wherein the power consumption and/or the power output is dependent on the voltage on the high-voltage side. Due to the fact that the power consumption or power output depends via the switching hysteresis on the voltage of the high-voltage side, the energy store controls itself without further intervention from outside.

If an energy store comprising a multiplicity of cell stacks is used preferably in the kW range with each cell stack being equipped with such a DC/DC converter, a finely controllable power range can be achieved in a very simple manner. In doing so, a first and a second cell stack are connected in a particularly advantageous manner to a first and a second bidirectional DC/DC converter, wherein the first and the second DC/DC converters have different switching hystereses defining the charging and/or discharging processes. In this manner, the individual cell stacks control themselves via the parameterization of the DC/DC converter (the switching hystereses thereof), as a result of which a very simple and, at the same time, very fine closed-loop control can be achieved.

Particularly advantageous, the energy storage is implemented as a redox flow battery wherein all cell stacks or in each case a group of cell stacks are supplied from the same electrolyte fluid circuit. This ensures that all cell stacks through which the same electrolyte is pumped have the same state of charge so that the closed-loop control is further simplified because there is no need to consider differently charged cell stacks. However, at the same time, systems with different energy stores and different states of charge or a plurality of electrolyte fluid circuits are also possible because the DC/DC converters decouple the individual energy stores.

Different switching hystereses can be achieved in a very simple manner in that the switching hystereses are parameterized with different switching points.

Preferably, a DC/DC converter is provided which has a switching hysteresis consisting in each case of a straight line for the charging and discharge processes since in this manner, a very simple relationship between the voltage of the DC bus and the power output and power consumption, respectively, can be established.

Further, very simple parameter settings of the switching hystereses SH are also possible, e.g., in that the straight lines of different switching hystereses and/or the straight lines of a charging and discharge process of a switching hysteresis have different gradients, or in that a switching hysteresis has a different charging and discharge curve. In this manner, the power consumption and the power output, respectively, of the individual cell stacks can be adjusted in a simple manner, e.g., via the power gradients. In addition, a switching hysteresis with a dynamically changeable switching point and/or with a dynamically changeable charging and discharge curve could also be provided. All this makes it possible to adapt the energy store in a very simple manner to the respective application.

The energy store according to the invention is used in a particularly preferred manner in an installation for storing electrical energy, in which installation the electrical energy store is connected via a DC/DC converter to a DC bus, wherein the power consumption and/or the power output of the DC/DC converter is dependent on the voltage of the DC bus. Thus, such an installation can be controlled in a very simple manner.

Particularly advantageous, a central control unit is provided in such an installation, which control unit is connected via a data bus to the electrical energy store and to the energy generator and optionally to the DC/AC converter. Therewith, possible parameter changes or basic settings of the switching hysteresis can be changed or performed from a central point in a very simple manner.

BRIEF DESCRIPTION OF THE DRAWINGS

The present invention will be explained hereinafter in more detail with reference to FIGS. 1 to 7, which schematically show advantageous configurations of the invention. In the figures

DETAILED DESCRIPTION OF THE EMBODIMENTS

Figure 1:
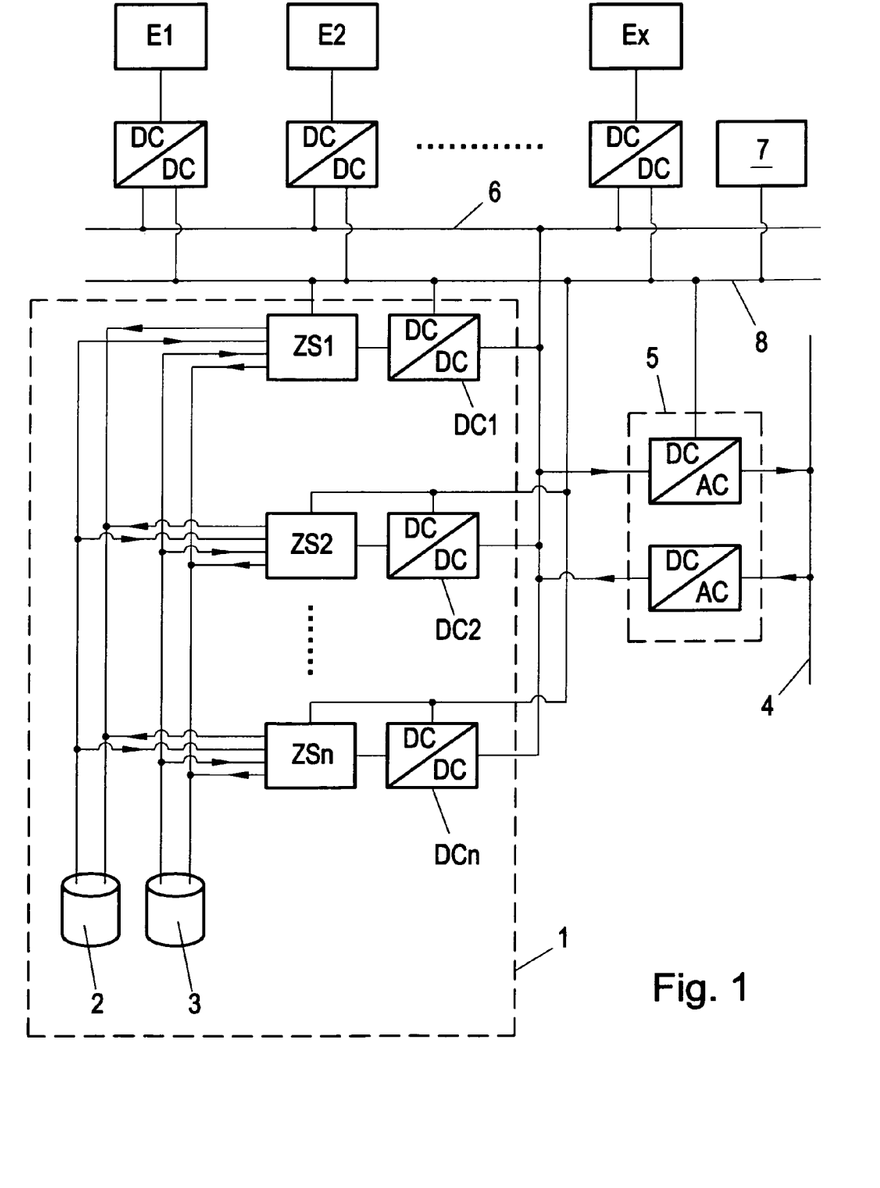
FIG. 1 shows a circuit diagram of an installation for generating electrical energy.

FIG. 1 shows an installation for generating alternative energy with energy generating units E1, e.g., a wind power plant, E2, e.g., a photovoltaic installation and Ex, e.g., a generator, which each supply via a DC/DC converter into a DC bus 6. For storing excessive energy or for compensating an energy deficit, an energy store, here, e.g., a redox flow battery 1, is provided which is also connected to the DC bus 6. An electrical supply grid 4 to which a non-illustrated load is connected is supplied via a DC/AC converter 5. It can also be provided, as indicated in FIG. 1, that the supply grid 4 supplies back via the DC/AC converter 5, e.g., so as to charge the energy store which is in this case the redox flow battery 1. The DC/AC converter 5 operates here as a command variable in the supply grid 4 or can be operated parallel to an existing supply grid. Further units such as e.g., a PV inverter can be connected via a DC/AC converter to the supply grid 4, or an emergency generator can be connected without converter to the supply grid.

It is well known that a redox flow battery 1 consists of a number of cell stacks ZS1 . . . ZSn, each of which comprise a number of individual cells. Electrolyte fluids which are circulated through the cell stacks ZS1 . . . ZSn are stored in the tanks 2, 3. The redox reaction then takes place in the cells so that electrical energy is generated or the redox flow battery 1 is charged. The function, the properties and the structure of a redox flow battery 1 are well known, which is the reason why this is not discussed any further here, especially because the type of energy store is not of particular importance for the present invention.

A redox flow battery 1 has the special feature here that all cell stacks ZS of the battery are connected to the same fluid circuit, as a result of which all cells or cell stacks have the same state of charge (SOC) and the individual cell stacks ZS, however, can be operated electrically independent of each other. It could also be provided that in each case one group of cell stacks ZS is connected to one electrolyte circuit while another group is connected to another electrolyte circuit, or a different storage technology is operated in parallel thereto.

According to the invention, in each case one bidirectional DC/AC converter DC1 . . . DCn is connected to the individual cell stacks ZS1 . . . ZSn of the electrical energy store, which converter increases the voltage generated in the cell stacks ZS1 . . . ZSn to the voltage of the DC bus 6. For this purpose, the high-voltage side of the DC/DC converters DC1 . . . DC2 is connected in each case to the DC bus 6. For example, a cell stack ZS of a redox flow battery 1 could consist of 27 individual cells, could generate 25 to 40V DC, and provide 2.5 kW power output. The output voltage of the cell stack ZS is increased by the connected DC/DC converter to the voltage of the DC bus 6, e.g., 700V DC.

The respective DC/DC converter decouples the connected cell stack ZS from the DC bus 6. As a result, controlling the output power of the cell stack ZS can take place independent of the output power of the overall arrangement. This arrangement thus also enables coupling different battery technologies and considers different capabilities of each of the connected energy stores.

However, it could also be provided that two or more cell stacks ZS are jointly connected to a DC/DC converter. Likewise, instead of a redox flow battery 1, another battery having a multiplicity of cells to be connected as cell stacks can also be used, e.g., a lead acid battery or a lithium ion battery. Furthermore, other energy stores such as, e.g., fuel cells or also flywheel accumulators can also be integrated into the system as long as they have a suitable DC/DC converter with a compatible output characteristic. In principle, each energy store can be connected via the high-voltage side of a bidirectional DC/DC to the DC bus 6, wherein the DC/DC converter has a charging and/or discharge curve with a switching hysteresis SH which is dependent on the voltage on the high-voltage side, which is in this case the voltage $U_{DCB}$ of the DC bus 6.

Thus, it is also possible to connect a plurality of energy stores and different energy stores to the DC bus 6.

The voltage range of the DC bus 2 ranges between an upper voltage limit $U_{DCBO}$ and a lower voltage limit $U_{DCBU}$, e.g., between 750V DC and 650V DC, and the DC/DC converters DC1 . . . DCn of the cell stacks ZS1 . . . ZSn have switching hystereses SH (characteristics) with different switching points $U_{SPU}$, $U_{SPO}$, as described below by means of the FIGS. 2a to 2c. Through the switching points $U_{SPU}$ and $U_{SPO}$ it is specified at which voltage $U_{DCB}$ of the DC bus 6 charging or discharging the energy store begins. The steepness of the straight lines of the switching hystereses SH defines with which power charging or discharging takes place. The DC/DC converters DC1 . . . DCn thus derive the respective power setpoint value from the voltage $U_{DCB}$ of the DC bus 6. The function $P=f(U_{DCB})$ can be parameterized in each individual DC/DC converter DC1 . . . DCn. The magnitude of the voltage limits $U_{DCBO}$, $U_{DCBU}$, the charging and discharge curves and the maximum charging or discharging power $P_{max}$ can be specified during system dimensioning.

However, it is of course also possible that two or more DC/DC converters have switching hystereses SH with the same switching points but with different charging and/or discharge curves. For a non-rechargeable battery it would naturally also be sufficient to limit the switching hysteresis SH to only the discharging process. It could also be provided to only load a battery so that the charging part of the switching hysteresis SH would be sufficient; however, the stability of the converter has to be ensured over the entire voltage range.

FIG. 2 illustrates in each case the power of a cell stack ZS as a function of the voltage $U_{DCB}$ of the DC bus 6. Positive power means here that the cell stack ZS is charged, and negative power means that the cell stack ZS is discharged. $P_{max}$ is the maximum discharging and charging power, respectively, of the cell stack ZS, which can also be different.

Figure 2A:
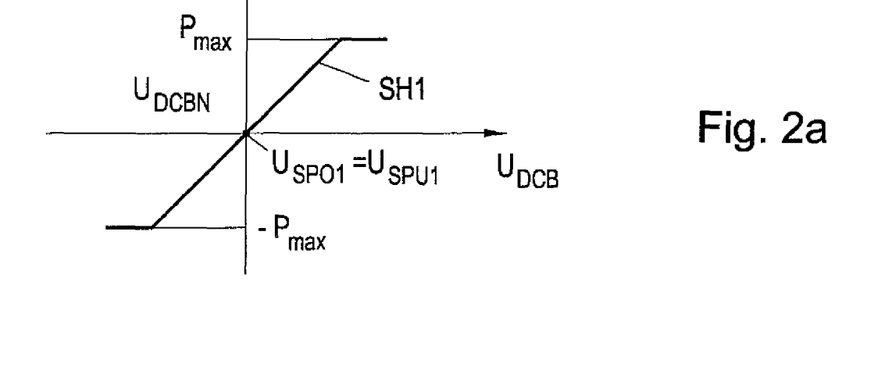
FIGS. 2 to 6 show different switching hystereses of the DC/DC converter.
Figure 2B:
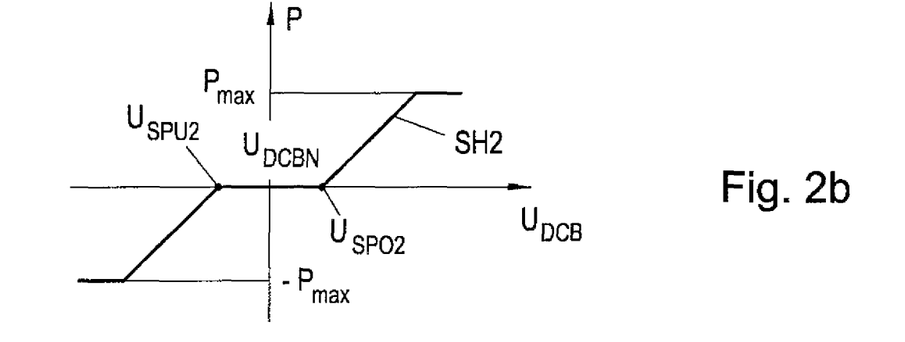
Figure 2C:
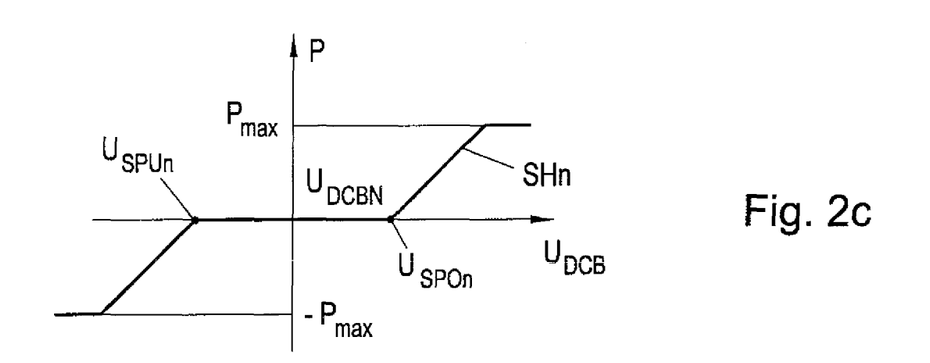

The switching points $U_{SPU1}$, $U_{SPO1}$ of the bidirectional DC/DC converter DC1 of the first cell stack ZS1 are set in such a manner that both coincide with each other in the nominal voltage $U_{DCBN}$ of the DC bus 6, e.g., 700V DC (FIG. 2a). In the case of voltages $U_{DCB}$ of the DC bus 6 higher than the nominal voltage $U_{DCBN}$ the cell stack ZS1 is charged according to the charging curve, and in the case of lower voltages, is discharged according to the discharge curve. The DC/DC converter DC2 of the second cell stack ZS2 has an upper switching point $U_{SPO2}$ that is higher than the nominal voltage $U_{DCBN}$ of the DC bus 6, e.g., 710V DC, and a lower switching point $U_{SPU2}$ that is lower than the nominal voltage $U_{DCBN}$ of the DC bus 6, e.g., 690V DC (FIG. 2b). Analogously, the DC/DC converter DCn of the $n^{th}$ cell stack ZSn has an upper switching point $U_{SPOn}$ that is higher than the nominal voltage $U_{DCBN}$ of the DC bus 6, e.g., 730V DC, and a lower switching point $U_{SPUn}$ that is lower than the nominal voltage $U_{DCBN}$ of the DC bus 6, e.g., 670V DC (FIG. 2c). Thus, charging or discharging these cell stacks ZS2, ZSn begins only upon reaching the respective switching point. In this manner, any number of cell stacks ZS can be connected to the DC bus 6.

The switching points $U_{SPO}$, $U_{SPU}$ and the switching hystereses SH do not have to be arranged symmetrically about an operating point with the power zero (in the example above, this would be nominal voltage $U_{DCBN}$ of, e.g., 700V), but can be adapted to the capacity of the respective energy storage system. In this manner, energy stores with different capacity data can also be considered for charging and discharging.

When increasing the load, e.g., because additional loads are connected by consumers to the supply grid 4, the voltage $U_{DCB}$ of the DC bus 6 decreases. Upon reaching the respective lower switching point $U_{SPU}$, the individual cell stacks ZS are now also connected thereto. If the voltage $U_{DCB}$ of the DC bus 6 increases, e.g., because loads are disconnected, the cell stacks ZS are charged upon reaching the respective upper switching point $U_{SPO}$. In this manner, a very simple closed-loop control can be implemented, wherein the cell stacks ZS connect or disconnect or charge or discharge automatically via the switching hystereses SH of their associated DC/DC converters DC1 . . . DCn, and the power output or power consumption changes self-controlled according to the set switching hysteresis SH. Since each cell stack ZS, thus a small electric unit having a power output in the kW range, is controlled, a very fine closed-loop control is achieved at the same time.

Figure 3:
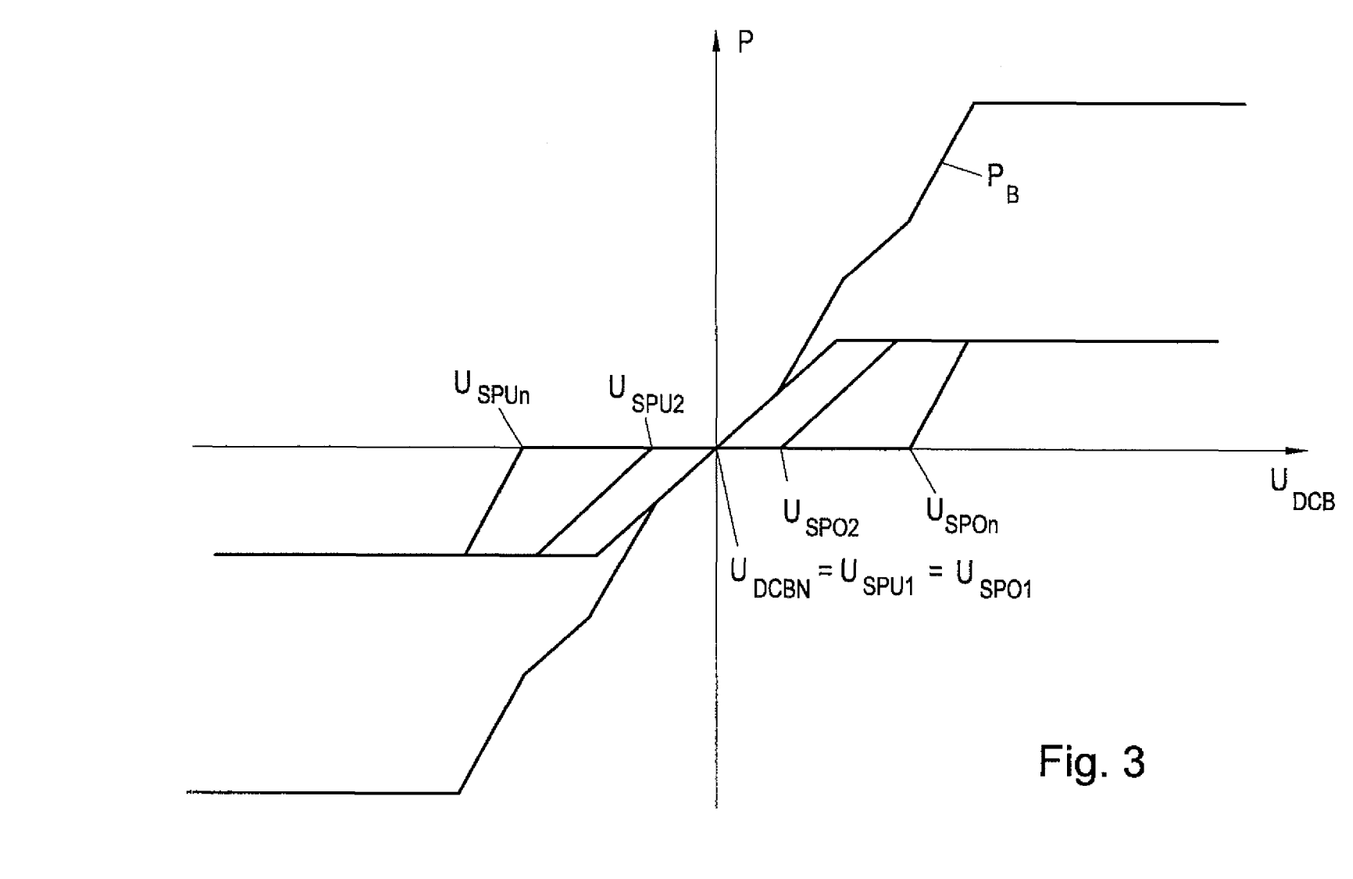

FIG. 3 shows the resulting course of the total power $P_B$ of the redox flow battery 1 as a function of the voltage $U_{DCB}$ of the DC bus 6, or as a function of the switching hystereses, which course results from the superposition of the individual switching hystereses SH.

The installation for generating electrical energy as illustrated in FIG. 1 thus could work as follows. The energy supply of the second energy supply unit E2, e.g., a photovoltaic installation, is not sufficient to supply the consumers connected to the supply grid 4, as a result of which the voltage in the DC bus 6 decreases. Besides the solar energy, additional energy from a storage is therefore needed, in this case here, e.g., from the redox flow battery 1. Initially, the bottleneck can be covered through the first cell stack ZS1. With increasing load or decreasing feed-in power of the energy generating unit E2, the voltage of the DC bus 6 continues to drop until the lower switching point $U_{SPU2}$ of the second cell stack ZS2 is reached and the switching hysteresis SH2 becomes active, and therefore power is drawn from the second cell stack ZS2. If the consumer power is still higher than the total of the fed-in solar power and the power of the discharging cell stacks ZS1, ZS2 together, the voltage level of the DC bus 6 continues to drop until the lower switching point $U_{SPUn}$ of the next cell stack ZSn is reached and the switching hysteresis becomes active, and therefore power is drawn from this cell stack ZSn. If the consumer power is still higher than the feed-in power of the energy source E2 plus the power of the discharging cell stacks ZS1 . . . ZS1n, the voltage $U_{DCB}$ of the DC bus 6 continues to drop until the lower limit value $U_{DCBU}$ of the voltage range of the DC bus 6 is reached. At this point, the full battery power is exhausted and a further energy source Ex is to be activated such as, e.g., an additional generator, which supplies additional power so as to ensure the stability of the system. According to the same principle, the cell stacks ZS1 . . . ZSn are charged in reverse order if the voltage $U_{DCB}$ of the DC bus 6 becomes higher than the nominal voltage $U_{DCBN}$ of the DC bus 6.

In the case of a redox flow battery 1, the cell stacks ZS thereof are all connected in a particularly advantageous manner to the same electrolyte fluid circuit, of course, not an individual cell stack ZS but rather the whole redox flow battery is charged, whereby charging a cell stack ZS has influence on all cell stacks ZS of the redox flow battery 1.

As is apparent from the above explanation, in this closed-loop control process, the DC bus 6 is used as a fast communication medium that directly controls the output power of the individual storage modules or cell stacks ZS and the generating units E. As a result, communication for closed-loop control tasks by means of field bus or the like can be dispensed with.

However, other parameter settings for the switching hystereses SH are also possible which, e.g., influence specifically the energy flows, or such parameter settings that the voltage $U_{DCB}$ of the DC bus 6 depends in addition on the state of charge SOC of the whole storage system. All such methods are conceivable and, depending on the application, are useful or advantageous. Below, examples for such applications are described.

Figure 4:
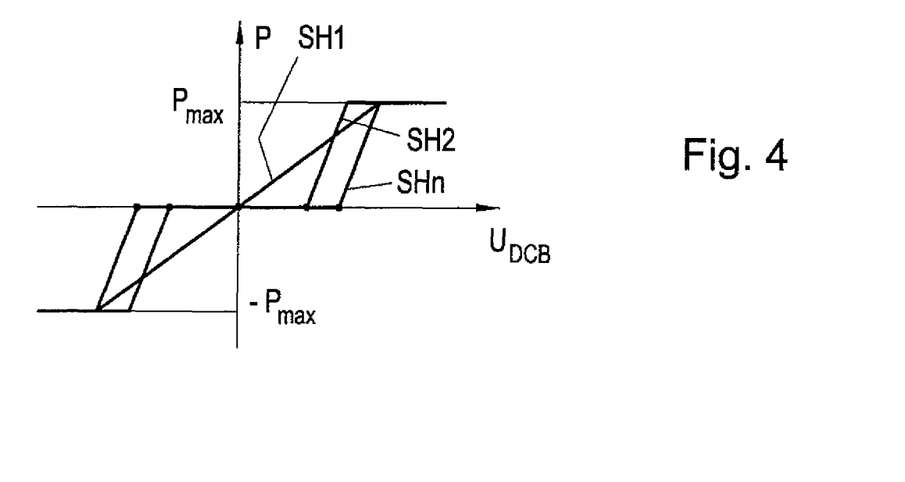

The switching hystereses SH in FIG. 2 are straight lines which each have the same gradient. By providing different gradients or curves instead of straight lines, the adjustment of the cell stacks ZS1 . . . ZSn can be further optimized. As shown in FIG. 3, superposition of a plurality of switching hystereses SH1 . . . SHn with identical gradients effects a sharper increase of the total power $P_B$. Thus, by changing the gradient or curves of individual cell stacks ZS1 . . . ZSn, the overall behavior can be influenced. In FIG. 4, the gradients of the switching hystereses SH2, SHn of the second and $n^{th}$ cell stacks ZS2, ZSn have been increased. As a consequence, the charging or discharging power of these cell stacks ZS2, ZSn is increased much faster. Depending on the load behavior, this could be useful, e.g., to discharge the first cell stack ZS1 faster or to provide a buffer for power jumps. It is of course also conceivable to provide straight lines with different gradients or different curves for the charging and discharging process of a switching hysteresis.

Figure 5:
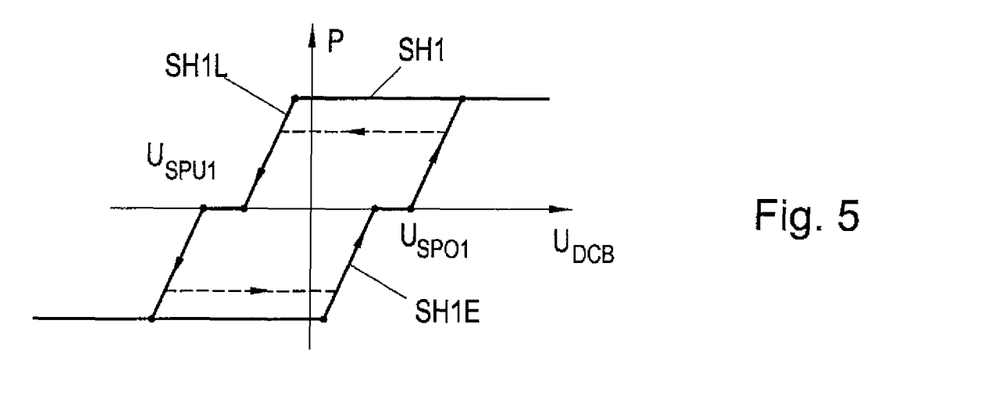

It is also possible to use two different switching hystereses for the charging and discharging operation, as illustrated by means of FIG. 5. Here, a distinction is made between a discharging and a charging course for which separate charging and discharge curves are provided.

During charging, the charging curve SH1L (upper portion of the switching hysteresis SH1) is been followed, and during discharging, the discharge curve SH1E (lower portion of the switching hysteresis SH1) is been followed. Discharging and charging within these charging and discharge curves SH1L, SH1E takes place according to a straight line parallel to the x-axis. If, for example, the total power flow changes short-term from discharging to charging, the controller follows the discharge line parallel to the x-axis, as indicated by the dashed line in FIG. 5. In such a case, the resulting energy surplus would be absorbed by the other cell stacks ZS2, ZSn. If the total power flow changes short-term from charging to discharging, the controller continues to follow the charging curve parallel to the x-axis, as indicated by the dashed line in FIG. 5, and the energy deficit would be made available by the other cell stacks ZS2, ZSn. The advantage of this variant is that a charge transport between the cell stacks ZS1 ZSn can take place. This variant, e.g., is specifically of advantage for the use of lead acid batteries because longer charging and discharging cycles can increase the operating life of such a battery.

Figure 6:
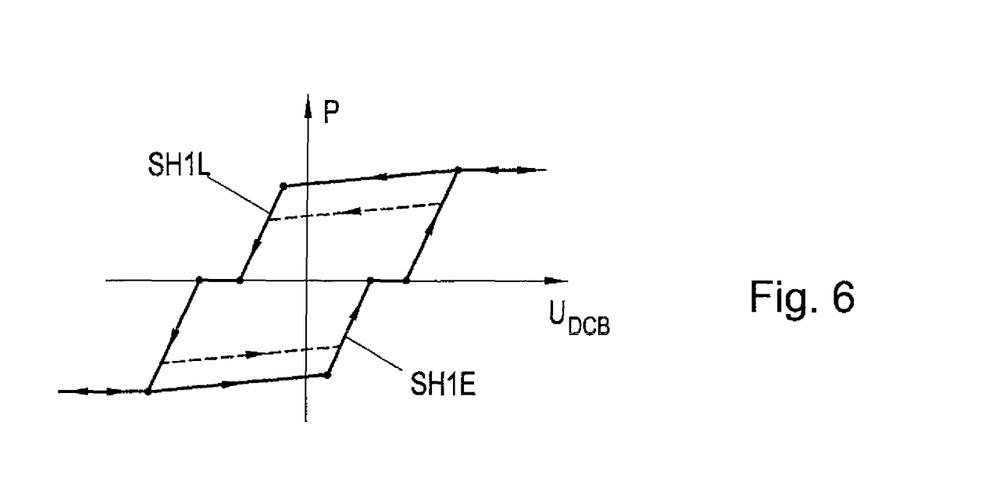

Instead of a constant power consumption or power output, thus, a straight line parallel to the x-axis as in the example according to FIG. 5, it is also possible that a straight line with a given gradient is provided therebetween, as illustrated in FIG. 6.

Figure 7:
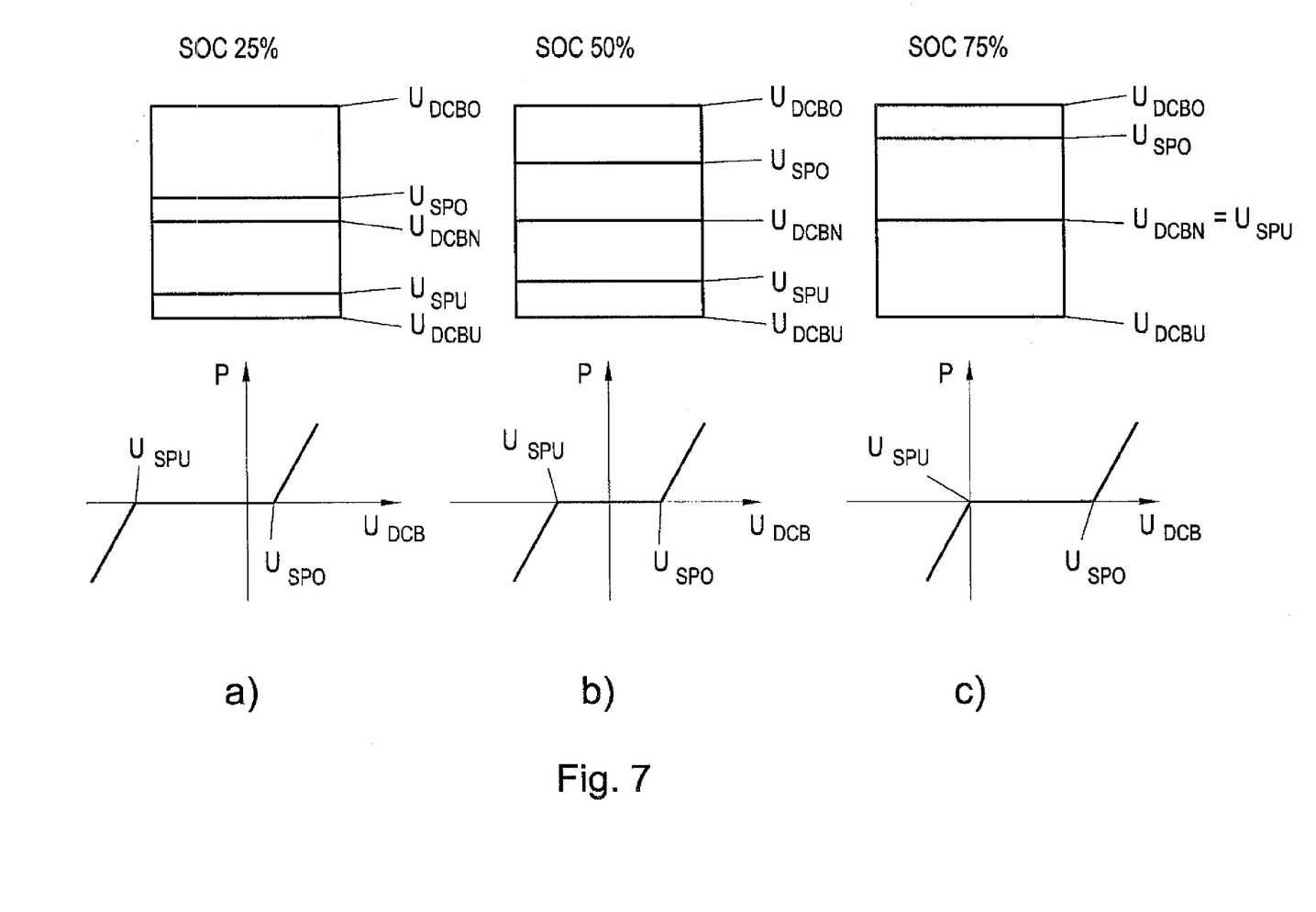
FIG. 7 shows the dynamic adaptation of the switching points of a switching hysteresis.

The above examples according to the FIGS. 2 to 6 could also be combined with a dynamic adaptation of the switching points $U_{SPU}$, $U_{SPO}$, e.g., in dependence on one or a plurality of parameters of the energy store, e.g., in dependence on the state of charge SOC of the connected energy store. This shall be explained by means of FIG. 7. Depending on the state of charge SOC, the switching points $U_{SPU}$, $U_{SPO}$ of the switching hystereses SH are dynamically changed. If the state of charge is low, FIG. 7a), the switching points $U_{SPU}$, $U_{SPO}$ are shifted downward so as to achieve an earlier switchover to charging. If the state of charge SOC is high, FIG. 7c), discharging can already take place at a higher voltage of the DC bus 6. Shifting can also be related in each case to only one straight line.

The adaptation of the switching points $U_{SPU}$, $U_{SPO}$ of the switching hystereses SH can also be used to adapt the energy store to changed situations, e.g., so as to cover for expected power jumps, to discharge idle units (charge balancing between cell stacks), or to specifically charge the energy store or individual cell stacks ZS.

If energy is available in the supply grid 4 for charging the energy store or individual cell stacks ZS, the charging process can also be forced by increasing the DC bus voltage $U_{DCB}$, e.g., by a parameter change at the DC/AC converter 5.

Likewise, the gradients of the charging and discharge curves or the charging and discharge curves themselves could be dynamically adapted in dependence on one or a plurality of parameters of the battery, e.g., the state of charge SOC, or the state of health SOH, or in dependence on the overall system.

These dynamic adaptations could be performed, e.g., by a central control unit 7 which is connected via a bus 8, e.g., a CAN bus, to the different components, e.g., the cell stacks ZS1 . . . ZSn, the DC/DC converters DC and/or the DC/AC converter 5, as illustrated in FIG. 1. Usually, it will not be required to connect the cell stacks ZS1 . . . ZSn to the data bus; rather, it will be sufficient to connect only the DC/DC converters thereof. The dynamic adaptation could also take place by means of a self-learning algorithm so that the DC/DC converter changes its characteristic power curve in dependence on the state of the energy store connected to said converter. However, during the dynamic adaptation it should be ensured that this does not impair the overall performance of the AC system.

The central control unit 7 can also serve for visualizing the states of the individual components and receives for this corresponding status information such as, e.g., voltages, currents, power outputs, SOC, SOH, etc. However, the bus 8 does not serve for communication between the individual DC/DC converters which communicate with each other only indirectly via the voltage level of the DC bus 6. The central control unit 7 can also assume general control tasks, e.g., start, stop or standby of the energy store, emergency stop, enable charging or discharging in dependence on the operating state of the energy store, e.g., no charging without pump pressure. Likewise, characteristic operating data can be chronologically collected and recorded in the central control unit, which data can be evaluated at a later time. Such data can also be used for optimizing the operation of the installation, e.g., for dynamically setting the switching points or gradients of the switching hystereses SH.

The DC/DC converters of the other alternative energy sources E, e.g., a wind power installation, a photovoltaic installation, a generator, etc., in the installation for generating electrical energy as illustrated in FIG. 1, can be controlled, of course, as described above by means of the FIGS. 2 to 7. However, with the generating units E, only characteristic curves in the $4^{th}$ quadrant can be changed (when using the consumer counting arrow system). With this, the DC bus 6 is fully self-regulating.

The invention claimed is:

1. An electrical energy store comprising:
    a plurality of cell stacks, each cell stack having a plurality of individual cells, and
    a plurality of bidirectional DC/DC converters, each of said plurality of bidirectional DC/DC converters having a low voltage side and a high voltage side,
    wherein a first cell stack and a second cell stack of said plurality of cell stacks are respectively connected to a first bidirectional DC/DC converter and a second bidirectional DC/DC converter, and the high voltage sides of the first bidirectional DC/DC converter and the second bidirectional DC/DC converter are connected to a DC bus and the first bidirectional DC/DC converter and the second bidirectional DC/DC converter have a switching hysteresis with a charging and/or discharging curve, power consumptions and/or power outputs which are dependent on a voltage on the high-voltage side of each of the first bidirectional DC/DC converter and the second bidirectional DC/DC converter.

2. The electrical energy store according to claim 1, wherein the first bidirectional DC/DC converter, and the second bidirectional DC/DC converter have switching hystereses with different charging curve and/or discharging curve.

3. The electrical energy store according to claim 1, wherein said plurality of cell stacks or a group of cell stacks provide a redox flow battery and are supplied by a common electrolyte fluid circuit.

4. The electrical energy store according to claim 2, wherein the first bidirectional DC/DC converter and the second bidirectional DC/DC converter have switching hystereses with different switching points.

5. The electrical energy store according to claim 1, comprising DC/DC converters each has a switching hysteresis consisting of a straight line as a charging and discharging curve.

6. The electrical energy store according to claim 5, wherein the straight lines have different switching hystereses and/or the straight lines of the charging and discharging curves of switching hystereses have different gradients.

7. The electrical energy store according to claim 1, comprising DC/DC converters which have switching hystereses with different charging and discharging curves.

8. The electrical energy store according to claim 1, comprising DC/DC converters with a switching hysteresis having a dynamically changeable switching point and/or a dynamically changeable charging and discharging curve.

9. A method for controlling an electrical energy store which comprises a plurality of cell stacks, each cell stack is formed of a plurality of individual cells, a first bidirectional DC/DC converter connected to a first cell stack, said first bidirectional DC/DC converter having a low voltage side and a high voltage side and a switching hysteresis, and a second bidirectional DC/DC converter connected to a second cell stack, said second bidirectional DC/DC converter having a switching hysteresis, comprising controlling a power consumption and/or a power output of each of the first bidirectional DC/DC converter and the second bidirectional DC/DC converter in dependence on voltages of the high-voltage sides of said first bidirectional DC/DC converter and said second bidirectional DC/DC converter.

10. The method according to claim 9, comprising setting the switching hystereses of the first bidirectional DC/DC converter and the second bidirectional DC/DC converter to different values.

11. The method according to claim 9, wherein said electrical energy store comprises a redox flow battery and means for supplying fluid to all cell stacks thereof from a common electrolyte fluid circuit.

12. The method according to claim 9, comprising setting the switching hystereses of the first bidirectional DC/DC converter and the second bidirectional DC/DC converter to different switching points.

13. The method according to claim 9, wherein the first bidirectional DC/DC converter and the second bidirectional DC/DC converter derive respective power setpoint values according to their switching hystereses from the voltage of a DC bus connected to the first bidirectional DC/DC converter and the second bidirectional DC/DC converter.

14. The method according to claim 9, comprising changing a switching point and/or a charging curve or a discharging curve of a switching hysteresis during an operation of the electrical energy store.

15. An installation for storing electrical energy comprising an electrical energy store comprising a plurality of cell stacks which are each connected via a bidirectional DC/DC converter to a DC bus, and through switching hystereses of the bidirectional DC/DC converters, a power consumption and/or a power output a cell stack supplies to the DC bus or draws from the DC bus is determined by a voltage of the DC bus.

16. The installation according to claim 15, wherein the bidirectional DC/DC converters derive respective power setpoint values according to their switching hystereses from the voltage of the DC bus.

17. The installation according to claim 15, comprising a bidirectional DC/AC converter, which is connected to the DC bus on one side and to an alternating current grid on another side.

18. The installation according to claim 15, comprising a central control unit which is connected, via a data bus, to the electrical energy store, to an energy generator, and to a DC/AC converter.

19. The installation according to claim 15, comprising a further energy store which is connected via a DC/DC converter to the DC bus, and the DC/DC converter of said further energy store derives a respective power setpoint value according to switching hysteresis from the voltage of the DC bus.

* * * * *